United States Patent

Nishiyama

[11] Patent Number: 5,184,868
[45] Date of Patent: Feb. 9, 1993

[54] FRONT BODY STRUCTURE OF AN AUTOMOTIVE VEHICLE

[75] Inventor: Atsushi Nishiyama, Hiroshima, Japan

[73] Assignee: Mazda Motor Corporation, Hiroshima, Japan

[21] Appl. No.: 798,154

[22] Filed: Nov. 26, 1991

[30] Foreign Application Priority Data

Nov. 29, 1990 [JP] Japan .................. 2-127893[U]
Oct. 11, 1991 [JP] Japan .................. 3-082758[U]

[51] Int. Cl.⁵ ................................. B62D 21/15
[52] U.S. Cl. ................................. 296/189; 296/194; 296/204
[58] Field of Search ............... 296/188, 189, 194, 204; 280/784

[56] References Cited

U.S. PATENT DOCUMENTS

| | | | |
|---|---|---|---|
| 3,831,997 | 8/1974 | Myers | 296/189 |
| 3,848,886 | 11/1974 | Feustel et al. | 296/189 X |
| 4,194,763 | 3/1980 | Reidelbach et al. | 296/189 X |
| 4,702,515 | 10/1987 | Kato et al. | 296/189 |
| 4,822,096 | 4/1989 | Fujii | 296/194 |
| 5,100,189 | 3/1992 | Futamata et al. | 296/189 X |

FOREIGN PATENT DOCUMENTS

| | | |
|---|---|---|
| 55-25583 | 2/1980 | Japan . |
| 58-89475 | 5/1983 | Japan . |
| 63-64883 | 3/1988 | Japan . |

Primary Examiner—Charles A. Marmor
Assistant Examiner—Andrew C. Pike
Attorney, Agent, or Firm—Fish & Richardson

[57] ABSTRACT

A front body structure of an automotive vehicle includes a pair of support members disposed on opposite sides of a section between a front body and a passenger compartment of the automotive vehicle, the support members having high rigidity, and a pair of front side frames disposed in a lengthwise direction of the vehicle. Each of the front side frames includes a front portion, a rear portion connected to one of the support members and an, intensive deformable portion which allows intensive compressive deformation of a portion of the front side frame before the rear portion of the front side frame when the vehicle encounters a head-on collision.

5 Claims, 4 Drawing Sheets

FRONT BODY STRUCTURE OF AN AUTOMOTIVE VEHICLE

BACKGROUND OF THE INVENTION AND PRIOR ART STATEMENT

This invention relates to a front body structure of an automotive vehicle capable of effectively absorbing an impact load exerted thereon when the vehicle encounters a head-on collision.

There have been conventionally disposed front side frames formed as a closed channel extending in a lengthwise direction of a vehicle body on opposite sides of a front body of the vehicle as disclosed in, for example, Unexamined Japanese Utility Model Application No. 55-25583. These front side frames, constituting a basic structure of the front body of the vehicle, are formed in such a manner that a center portion thereof with respect to the lengthwise direction of the vehicle, i.e., a portion thereof positioned right before a passenger compartment, has higher rigidity than front end portions thereof. In this way, the front side frames are designed to absorb an impact load exerted on the front body of the vehicle when the vehicle encounters a head-on collision by rendering the front end portions thereof crushed up.

The conventional front body structure of the vehicle is such that the impact load of the head-on collision of the vehicle is concentrated on the front end portions of the front side frames, and thereby the front end portions are intensively crushed. Accordingly, the front end portions of the front side frames are required to have sufficiently long length in order to effectively absorb the impact load of the head-on collision. This necessitates constructing the front body of the vehicle long, which presents a great restriction in designing a vehicle body.

It is an object of the present invention to provide a front body structure of an automotive vehicle designed to overcome the aforementioned drawback.

SUMMARY OF THE INVENTION

According to the present invention, a front body structure of an automotive vehicle comprises a pair of support members disposed on opposite sides of a section between a front body and a passenger compartment of the automotive vehicle, the support members having high rigidity, a pair of front side frames disposed in a lengthwise direction of the vehicle, each of the front side frames including a front portion, a rear portion connected to one of the support members, and an intensive deformable means for allowing intensive compressive deformation of a portion before the rear portion of the front side frame when the vehicle encounters a head-on collision.

Also, the front portion of the front side frame has a first wall and a second wall opposed to each other; the intensive deformable means including a first intensive deformable portion formed on the first wall, and a second intensive deformable portion formed on the second wall.

Further, the first intensive deformable portion and the second intensive deformable portion are offset from each other in the lengthwise direction of the vehicle.

Furthermore, the front portion is provided with a front reinforcement member and the rear portion is provided with a rear reinforcement member. The front and rear reinforcement members are disposed in the front side frame; the first intensive deformable portion being formed by arranging the front reinforcement and the rear reinforcement so as to provide a space between a front end of the rear reinforcement member and a rear end of the front reinforcement member for locally reducing the rigidity of the first wall, and the second intensive deformable portion being formed by cutting away a portion of the front reinforcement member so as to provide a space for locally reducing the rigidity of the second wall.

Furthermore, the second intensive deformable portion is formed by cutting away a portion of a rear end portion of the front reinforcement member facing the second wall.

With these constructions, the support members are disposed on the opposite sides of the section between the front body and the passenger compartment, and the pair of front side frames are attached to the support members by way of the respective rear portions of the front side frames. The intensive deformable means is provided to allow intensive compressive deformation of a portion before the rear portion of the front side frame which is connected to the support member having high rigidity.

Accordingly, when the vehicle encounters a head-on collision, the impact load is effectively absorbed by the intensive deformable means, and consequently not transmitted to the passenger compartment.

Also, the intensive deformable portions are formed on the opposite walls. Accordingly, when the vehicle encounters a head-on collision, deformation occurs at the opposite walls of the front portion of the front side frame, and whereby the front portion of the front side frame is compressed substantially straight in the lengthwise direction of the vehicle. Thus, the impact load of the collision can be absorbed more effectively.

Further, the first intensive deformable portion and the second intensive deformable portion are offset from each other in the lengthwise direction of the vehicle. Accordingly, intensive compressive deformation can be attained more readily.

Furthermore, the front reinforcement member and the rear reinforcement member are disposed in the front side frame with the space being provided between them. Accordingly, in the usual time, an increased rigidity is given to the front side frame. On the other hand, in the case of encountering a head-on collision, intensive compressive deformation can be attained more readily.

Furthermore, the intensive deformable portion is formed by cutting away a portion of the rear end portion of the front reinforcement member. Accordingly, the intensive deformable portion can be made more easily.

These and other objects, features, and advantages of the present invention will become more apparent upon a reading of the following detailed description and accompanying drawings.

DETAILED DESCRIPTION OF PREFERRED EMBODIMENTS OF THE INVENTION

Figure 1:
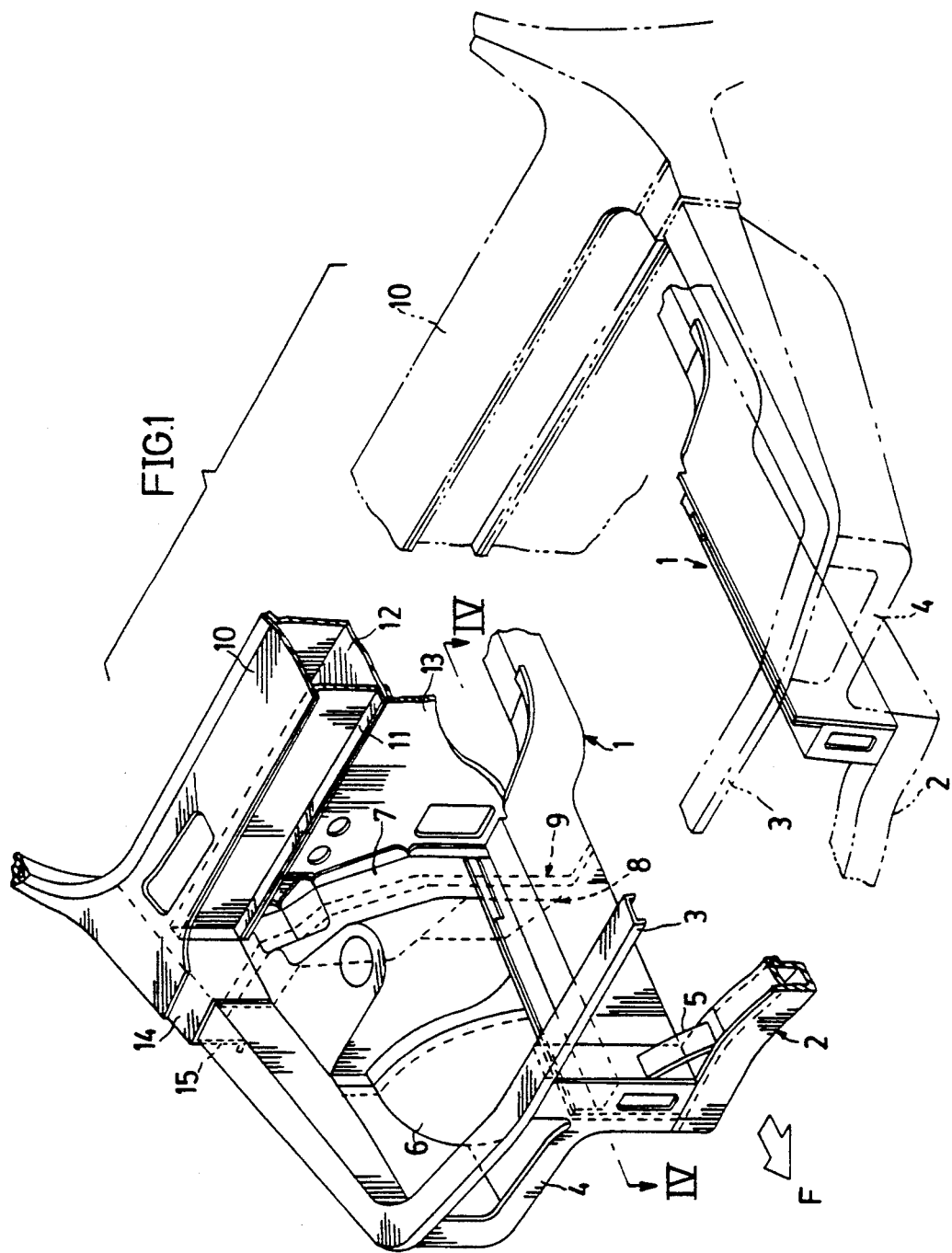
FIG. 1 is a perspective view showing a right half of a front body structure of an automotive vehicle embodying the invention.
Figure 2:
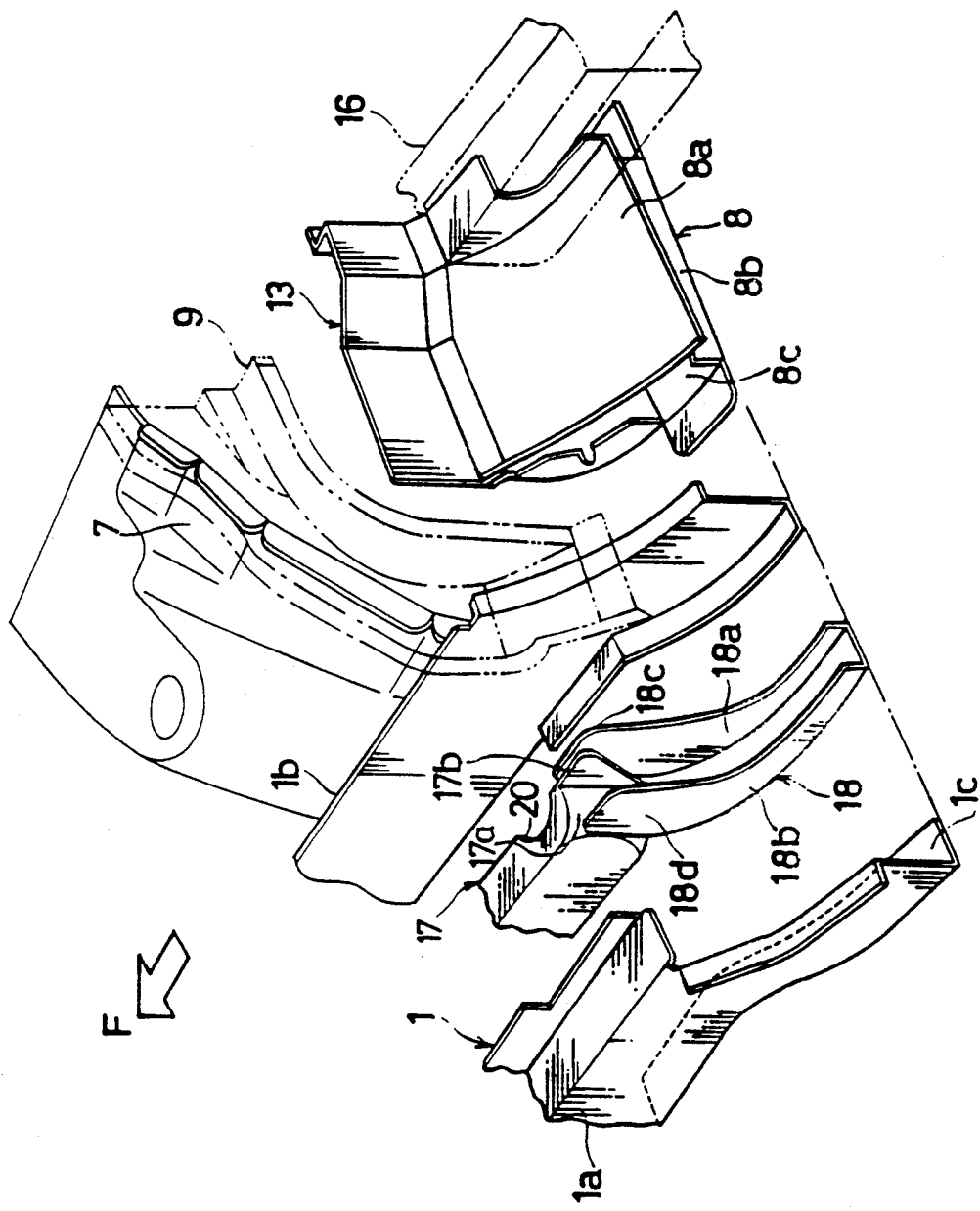
FIG. 2 is an exploded perspective view showing a front side frame and reinforcement members of the front body structure.
Figure 3:
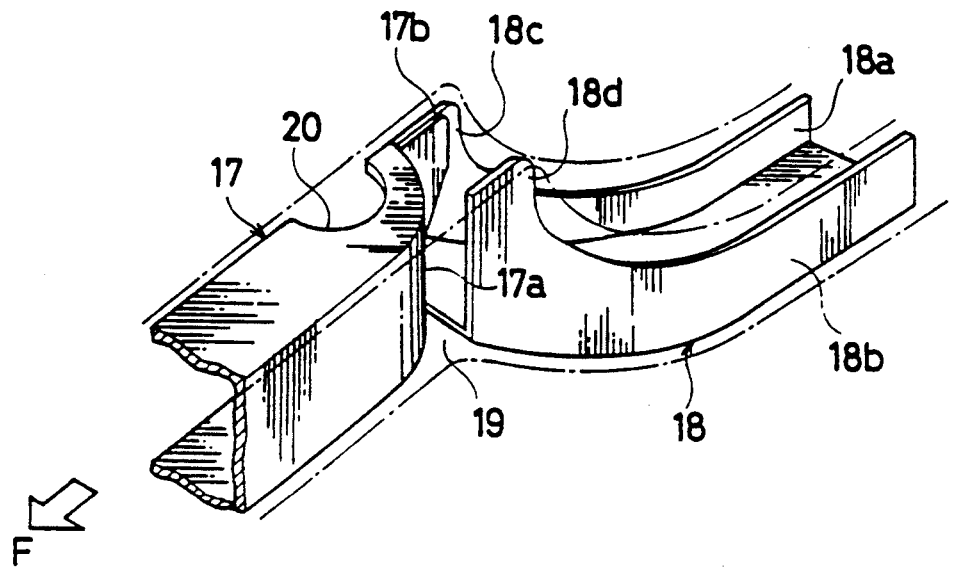
FIG. 3 is a perspective view showing a configuration of a front reinforcement member and a rear reinforcement member.

An embodiment of the present invention will be described with reference to FIGS. 1 to 5. FIGS. 1 and 2 show an embodiment of a front body structure of an automotive vehicle in accordance with the present invention. It will be understood that only a right half of the front body structure, when viewed from a driver in a passenger compartment, is shown in FIG. 1 and description made hereinafter is directed to the right half of the front body structure. However, since being a mirror image of the right one with respect to a center plane of the vehicle body normal to a widthwise direction of the vehicle body, a left half of the front body structure has the same construction and functions in the same manner as the right one. It will be, further, understood that terms "inward", "outward", "inner", and "outer" used in the specification are referred to directions parallel to a widthwise direction of the vehicle body with respect to the center plane of the vehicle body. Specifically, "inward" and "inner" refer to the directions toward the center plane of the vehicle body while "outward" and "outer" refer to the directions away therefrom. Furthermore, a large arrow F in each figure indicates a frontward direction from a passenger compartment.

The front body structure of the vehicle comprises a front side frame 1, a front cross member 2, a shroud upper member 3, a shroud panel 4, a shroud side panel 5, a wheel apron 6, a wheel apron rear member 7, a reinforcement member 8 in the shape of a box, an upper link member 9 serving as a reinforcement member for the wheel apron 6, a cowl panel 10, a cowl front panel 11, a dashboard upper panel 12, a dashboard lower panel 13, a cowl upper inner plate 14, and a cowl side reinforcement 15. The dashboard lower panel 13 serves as a firewall partitioning an engine compartment and a front section of the passenger compartment, constituting a front wall of the passenger compartment.

Referring to FIG. 2, the front side frame 1 is provided on a right side of the front body of the vehicle and includes an inner panel 1a, and an outer panel 1b, both extending in a lengthwise direction of the vehicle. A front portion of the inner panel 1a is so formed as to have a substantially U-shaped cross section, when taken along planes normal to the lengthwise direction of the vehicle, opening outward. A rear portion of the inner panel 1a is so formed as to have a substantially L-shaped cross-section opening upward and outward. The outer panel 1b of the front side frame 1 comprises a flat plate member shaped similarly to the inner panel 1a when viewed from the side, i.e., a direction perpendicular to the direction indicated by the arrow F in the plane of the drawing of FIG. 2. The inner panel 1a and the outer panel 1b are connected to each other, thereby defining an interior space 1c extending in the lengthwise direction of the vehicle.

More specifically, a front portion of the front side frame 1 has a closed hollow rectangular cross-section since the outward opening of the U-shaped front portion of the inner panel 1a is covered by the corresponding portion of the outer panel 1b. A rear portion of the front side frame 1 has a U-shaped cross-section opening upward since the outward opening of the L-shaped rear portion of the inner panel 1a is covered by the corresponding portion of the outer panel 1b.

The wheel apron rear member 7 includes a plate member, and provides a space for accommodating a portion of a front tire together with the wheel apron 6 disposed forward of the wheel apron rear member 7. The wheel apron rear member 7 is bent in a plurality of positions thereof so that an upper portion thereof is curved outward. A lower end of an inner surface of the wheel apron rear member 7 is connected to an upper end of an outer surface of the front portion of the outer panel 1b of the front side frame 1 in a specified position.

The box-shaped support member 8 includes a lower member 8b formed with curvature projecting downward, and an upper member 8a connected to the lower member 8b in such a manner as to cover an upward opening of the lower member 8b. The upper and the lower members 8a, 8b define a box-shaped space 8c.

A lower end of the dashboard lower panel 13 constituting the front wall of the passenger compartment is tightly held between a front end of the upper member 8a and that of the lower member 8b. An inner side surface of the box-shaped support member 8 is connected to the outer surface of the outer panel 1b of the front side frame 1 while an outer side surface thereof is connected to an inner surface of a side sill 16 extending in the lengthwise direction of the vehicle body along a lower side end of the vehicle body. Thus, the box-shaped support member 8 provides a floor panel in the front section of the passenger compartment.

Figure 4:
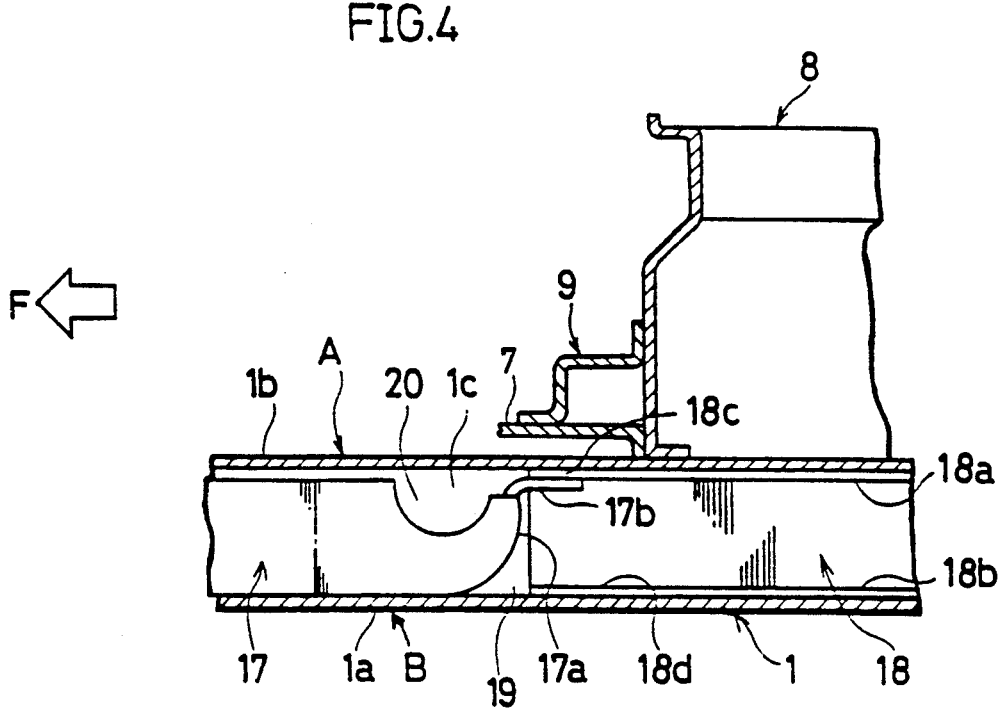
FIG. 4 is a plan view in section along line IV—IV as shown in FIG. 1 showing a configuration of the front side frame and elements secured thereto.

The upper link member 9 includes a plate member bendingly formed so as to have a substantial L-shape. The upper link member 9 has a flange portion facing upward, and another flange portion facing rearward. The upward facing flange portion of the upper link member 9 is connected to a lower surface of the wheel apron rear member 7 while the rearward facing flange portion thereof is connected to front faces of the box-shaped support member 8 and the dashboard lower panel 13, whereby defining a closed rectangular-shaped space along a contour of the wheel apron rear member 7 as shown in FIG. 4. In this way, the wheel apron rear member 7, upper link member 9, box-shaped support member 8, and the dashboard lower panel 13 constitute a wheel apron reinforcement member for reinforcing a rear end of the wheel apron 6 at a front end section of the passenger compartment.

A front reinforcement member 17 and a rear reinforcement member 18 are provided with a rear end of the front reinforcement member 17 and a front end of the rear reinforcement member 18 opposing each other in the internal space 1c of the front side frame 1. The front reinforcement member 17 is provided in a closed portion of the internal space 1c, i.e., a front portion of the front side frame 1. The front reinforcement member 17 is formed to have a U-shaped cross-section opening outward, when taken along a plane normal to the lengthwise direction of the vehicle body, and in such a size as to correspond to the configuration of the front portion of the front side frame 1. Further, the front reinforcement member 17 includes an arcuate rear wall 17a, when viewed from the above as shown in FIG. 4, for sealably covering the rear end of the front reinforcement member 17, and a connection flange 17b provided at an outward end of the rear wall 17a projectingly rearward.

The rear reinforcement member 18 is formed to have a U-shaped cross-section opening upward, and has an outer side wall 18a and an inner side wall 18b. The inner and the outer side walls 18b, 18a are formed in such a fashion that the more they extend to the rear end thereof, the lower the height thereof becomes. A forward end of the rear reinforcement member 18 is curved upward, thereby forming a kick-up reinforcement member. At forward ends of the inner and outer side walls 18b, 18a are respectively formed upright portions 18d, 18c, inner surfaces of the upright portions 18c, 18d opposing to the connection flange 17b of the front reinforcement member 17. The connection flange 17b is connected to the upright portion 18c positioned more outwardly than the other upright portion 18d.

Further, a space 19 of a predetermined size is defined between the more inwardly positioned upright portion 18d of the rear reinforcement member 18 and the rear wall 17a of the front reinforcement member 17. In other words, the space 19 is provided at an inward portion of a junction of the front and the rear reinforcement members 17, 18. Accordingly, the portion of the inner panel 1a of the front side frame 1 is intensively deformable which is not supported by the front reinforcement member 17 and has a locally lower rigidity. This portion will be referred to as inner intensive deformable portion.

Further, notches 20 in the shape of an arc are defined at outward end portions of an upper wall and a lower wall constituting in part the front reinforcement member 17. The rigidity of the front side frame 1 becomes low locally at the portion of the outer panel 1b which corresponds to the notches 20. This portion will be referred to as outer intensive deformable portion.

Accordingly, the front side frame 1 has at an intermediate portion thereof two intensive deformable portions where the rigidity is low: one at an inner portion and the other at an outer portion of the front side frame 1. The inner intensive deformable portion is disposed more rearward relative to the outer intensive deformable portion. In other words, the inner intensive deformable portion and the outer intensive deformable portion are offset from each other in the lengthwise direction of the vehicle. Further, the rear portion of the front side frame 1 in which the rear reinforcement member 18 is provided, i.e., a portion of the front side frame 1 positioned in the front section of the passenger compartment, is connected to the side sill 16 through the box-shaped support member 8 having a closed space, and also to the upper link member 9 having a closed space. This structure assures sufficient rigidity of the rear portion of the front side frame 1.

In the above structure, when the vehicle encounters a head-on collision, the front end (not shown in FIG. 2) of the front side frame 1 is firstly subjected to the impact load. Upon being subjected to the impact load, the front end of the front side frame 1 is crushed, whereby the impact load is absorbed to a certain degree. When the reduced impact load is imparted from the front end to the rear side of the front side frame 1, stresses are concentrated on the inner and outer intensive deformable portions of the front side frame 1 having low rigidity and corresponding respectively to the space 19 and the notches 20, with the result that the front side frame 1 is deformed centering on the inner and outer intensive deformable portions having low rigidity.

Figure 5:
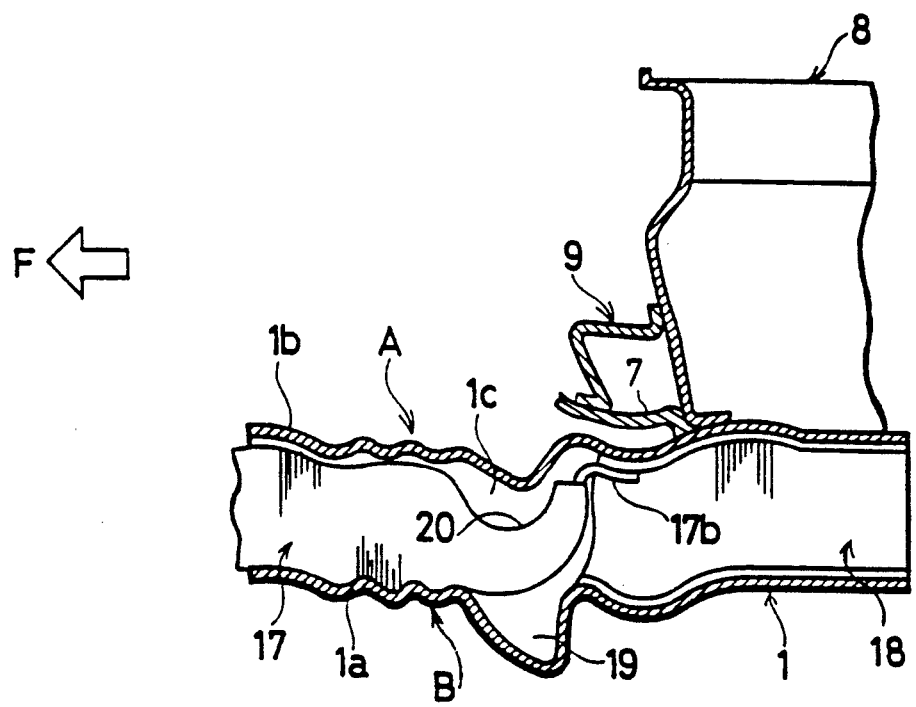
FIG. 5 is a plan view in section similar to FIG. 4 showing deformation of the front side frame at an occurrence of a head-on collision.

More specifically, the front side frame 1 is formed at the intermediate portion thereof with the inner and outer intensive deformable portions which respectively correspond to the space 19 and the notches 20. In addition, the rear portion of the front side frame 1 is reinforced by the box-shaped support member 8 and the upper link member 9 so as to have high rigidity. Accordingly, the front side frame 1 is deformed in the following manner at an occurrence of the head-on collision as shown in FIG. 5. The outward portion of the front side frame 1 is deformed at the outer intensive deformable portion which corresponds to the notches 20, and a portion A before the outer intensive deformable portion turns outward. Further, the inward portion of the front side frame 1 is deformed at the inner intensive deformable portion which correspond to the space 19, and a portion B before the inner intensive deformable portion turns inward. Consequently, the front portion of the front side frame 1 can receive the impact load with being compressed substantially straight in the lengthwise direction of the vehicle. Accordingly, the impact load can be absorbed more efficiently and be prevented from extending to the passenger compartment.

As described above, the intensive deformable portions are formed at the intermediate portion of the front side frame 1 by providing the space 19 and the notches 20. Thus, the front side frame 1 is constructed in such a manner that the inner intensive deformable portion which corresponds to the space 19 and the outer intensive deformable portion which corresponds to the notches 20 are compressed in the lengthwise direction. Accordingly, the front side frame 1 is deformed intensively at the intermediate portion thereof upon being subjected to the impact load caused by the head-on collision. Therefore, the impact load is absorbed at the front end portion and the intermediate portion of the front side frame 1, with the result that overall impact load absorption performance of the front side frame 1 can be greatly improved.

Moreover, the front section of the passenger compartment is reinforced by the box-shaped support member 8 and the upper link member 9. The rear reinforcement member 18 is arranged laterally adjacent to the support member 8 and the upper link member 9. This assures the rear portion of the front side frame 1 to have sufficient rigidity, whereby allowing the front section of the passenger compartment supported thereby to have high rigidity. In this way, the impact load at the occurrence of the head-on collision is concentrated on the inner and outer intensive deformable portions of the front side frame 1 which respectively correspond to the space 19 and the notches 20, thereby enabling effective deformation of these portions and reliably preventing the influence of the deformation from extending to the front section of the passenger compartment.

In the foregoing embodiment, the space 19 of a predetermined size is formed between the upright portion 18d formed on the inner side wall 18b of the rear reinforcement member 18 and the rear wall 17a of the front reinforcement member 17 to reduce the rigidity of the inner portion of the front side frame 1. However, the structure of such space is not limited to the foregoing embodiment, but can be modified in various ways. The impact load absorption performance of the front side frame 1 can be appropriately controlled by setting the shape, size, or the like of the space in a desired manner.

Further, it may be appropriate to provide a space between the upright portion 18c of the outer side wall 18a of the rear reinforcement member 18 and the rear wall 17a of the front reinforcement member 17 so as to reduce the rigidity of the outer portion of the front side frame 1.

The shape, position, and size of the notches 20 defined in the front reinforcement member 17 can be also modified in various ways. Alternatively, the front reinforcement member 17 may be constructed without the notches 20.

Further, in the foregoing embodiment, the front and the rear reinforcement members 17, 18 are accommodated in the internal space 1c defined within the front side frame 1. However, inner and outer front reinforcement members, and inner and outer rear reinforcement members may be respectively provided on the outside surfaces of the opposite sides of the front side frame 1 with an inner intensive deformable portion and an outer intensive deformable portion being formed between the front reinforcement members and the rear reinforcement members.

Furthermore, intensive deformable portions may be formed on an upper wall and a lower wall of the front side frame 1.

Moreover, it should be noted that intensive deformable portions are not required to be formed with being offset from each other in the lengthwise direction of the vehicle. Intensive deformable portions may be formed with being opposed to each other.

As described above, according to the present invention, intensive deformable portions are formed on opposite walls of a front side frame, and at an intermediate portion of the front side frame between a front reinforcement member and a rear reinforcement member provided on the front side frame. The structure of the front side frame is such that the intermediate portion of the front side frame is intensively deformed when an automotive vehicle encounters a head-on collision. Accordingly, the impact load caused by the head-on collision can be effectively absorbed by the respective intermediate portions of the front side frames in addition to front end portions thereof. This contributes to a substantial improvement in impact load absorption performance of the overall front side frame. Therefore, the impact load caused by the head-on collision can be absorbed by the front side frames without constructing the front end portions thereof long. In addition, the length of the front side frames can be desirably set in designing a vehicle body.

Also, box-shaped support members and wheel apron reinforcement members disposed on opposite sides of the front body structure of the vehicle reinforce a front section of a passenger compartment, and the rear reinforcement members are disposed in positions adjacent to the box-shaped support members and the wheel apron reinforcement members. This arrangement assures sufficient rigidity of the rear portions of the front side frames, i.e., a portion of the front side frame positioned rearward of the intermediate portion thereof. Accordingly, the impact load caused by the head-on collision imparted to the intermediate portion of the front side frame is concentrated on intensive deformable portions of the front side frame, and thereby deforming these portions effectively. In addition, the above arrangement is advantageous in preventing the influence of the deformation of the intermediate portion of the front side frame from extending to the front section of the passenger compartment.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A front body structure of an automotive vehicle comprising:
   a pair of support members disposed on opposite sides of a section between a front body and a passenger compartment of the automotive vehicle, the support members having high rigidity; and
   a pair of front side frames disposed in a lengthwise direction of the vehicle, each of the front side frames comprising:
   a front portion having a first wall and a second wall opposed to each other;
   a rear portion connected to one of the support members; and
   an intensive deformable means for allowing intensive compressive deformation of an intermediate portion before the rear portion of the front side frame when the vehicle encounters a head-on collision, comprising:
   a first intensive deformable portion formed on the first wall, and
   a second intensive deformable portion formed on the second wall, wherein
   each first intensive deformable portion and each second intensive deformable portion are offset from each other in the lengthwise direction of the vehicle;
   and wherein:
   the front portion of each front side frame is provided with a front reinforcement member therein;
   the rear portion of each front side frame is provided with a rear reinforcement member therein;
   each first intensive deformable portion is formed by arranging the corresponding front reinforcement member and the corresponding rear reinforcement member so as to provide a space between a front end of said corresponding rear reinforcement member and a rear end of said corresponding front reinforcement member for locally reducing rigidity of the corresponding first wall; and
   each second intensive deformable portion is formed by cutting away a portion of the corresponding front reinforcement member so as to provide a space for locally reducing rigidity of the corresponding second wall.

2. A front body structure of the automotive vehicle as defined in claim 1, wherein each second intensive deformable portion is formed by cutting away a portion of the rear end portion of the corresponding front reinforcement member facing the corresponding second wall.

3. A front body structure of the automotive vehicle as defined in claim 1, wherein each support member comprises
   a box-shaped support member
   and a wheel apron reinforcement member,
   and the corresponding rear reinforcement member is disposed in a position adjacent to the box-shaped support member and the wheel apron reinforcement member.

4. A front body structure of the automotive vehicle as defined in claim 1, wherein the front portion of each front side frame has a closed hollow rectangular cross section, and the corresponding front reinforcement member is disposed in the front portion of the corresponding front side frame.

5. A front body structure of the automotive vehicle as defined in claim 1, wherein:

each front reinforcement member has a connection flange extending from one side of the rear end of the corresponding front reinforcement member;

each rear reinforcement member has a wall on the same side of the front end of the corresponding rear reinforcement member as the connection flange of the corresponding front reinforcement member; and the connection flange of the corresponding front reinforcement member is connected to the wall of the corresponding rear reinforcement member.

* * * * *